United States Patent
Xiong et al.

(10) Patent No.: US 9,820,351 B1
(45) Date of Patent: Nov. 14, 2017

(54) CIRCUIT AND METHOD FOR ABNORMAL FAULT TESTING IN AN LED DRIVER

(71) Applicant: Universal Lighting Technologies, Inc., Madison, AL (US)

(72) Inventors: Wei Xiong, Madison, AL (US); Candice Ungacta, Huntsville, AL (US); Danny Pugh, Harvest, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 15/071,828

(22) Filed: Mar. 16, 2016

Related U.S. Application Data

(60) Provisional application No. 62/145,045, filed on Apr. 9, 2015.

(51) Int. Cl.
| | |
|---|---|
| H05B 33/08 | (2006.01) |
| H02H 9/04 | (2006.01) |
| G01R 31/02 | (2006.01) |
| G01R 31/12 | (2006.01) |

(52) U.S. Cl.
CPC ..... H05B 33/0887 (2013.01); H05B 33/0815 (2013.01)

(58) Field of Classification Search
None
See application file for complete search history.

(56) References Cited

U.S. PATENT DOCUMENTS

| | | | |
|---|---|---|---|
| 3,755,711 A | 8/1973 | Fendt | |
| 2004/0223346 A1 | 11/2004 | Rayner et al. | |
| 2011/0164339 A1 | 7/2011 | Schmid et al. | |
| 2016/0111970 A1* | 4/2016 | Nate | H02M 1/12 |
| | | | 315/201 |
| 2016/0205755 A1* | 7/2016 | Chou | H05B 41/295 |
| | | | 315/97 |

* cited by examiner

*Primary Examiner* — Dedei K Hammond
(74) *Attorney, Agent, or Firm* — Patterson Intellectual Property Law, P.C.; Mark J. Patterson; Gary L. Montle

(57) ABSTRACT

An LED driver is provided with transient protection circuitry to satisfy dielectric testing requirements. An embodiment of the driver includes a fuse coupled between an AC input and a DC power source, and first and second electrolytic capacitors coupled across the DC power source. Respective circuits including a transient voltage suppressor and a current limiting resistor are coupled in series across each of the electrolytic capacitors. The transient voltage suppressors have breakdown voltage thresholds slightly below a full rated output for the DC source, wherein a sensed short condition across one of the first and second electrolytic capacitors causes a short circuit across the DC source and thereby disabling of the LED driver prior to failure of the other electrolytic capacitor. The current limiting resistors further are configured to avoid causing the LED driver to be disabled for transient overvoltage conditions in which neither of the electrolytic capacitors is shorted.

14 Claims, 3 Drawing Sheets

CIRCUIT AND METHOD FOR ABNORMAL FAULT TESTING IN AN LED DRIVER

CROSS-REFERENCES TO RELATED APPLICATIONS

This application claims benefit of U.S. Provisional Patent Application No. 62/145,045, filed Apr. 9, 2015, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to LED power supplies. More particularly, the present invention relates to an LED driver having transient protection circuitry designed to satisfy dielectric testing requirements.

A conventional LED power supply 10, an example of which is represented in FIG. 1, may typically include a line fuse 12 and electromagnetic interference (hereinafter "EMI") filtering circuitry 13 provided between a sinusoidal AC source 11 and an input rectifier 14. The rectifier and a subsequent power factor correction (hereinafter "PFC") stage 15 convert an AC input to a high voltage DC output, further regulating the power factor and total harmonic distortion. A DC-DC converter stage 16 receives the high voltage DC output from the PFC stage, and is further configured to regulate the output voltage and current to a load 17.

Energy storage elements are conventionally used in DC-DC power converters for filtering, or "smoothing," pulsating DC input from a rectifier or PFC stage by absorbing peak currents and ripple currents while providing a relatively constant DC voltage output. For a 120-277V input driver, the output voltage of the PFC stage is typically around 470V DC. For a 347V input driver, the output voltage of the PFC stage is around 600V. Because of the relatively high voltages involved, first and second electrolytic capacitors C1, C2 are often provided as energy storage elements at the output of the PFC stage. In the particular case of a 470V output, two 250V electrolytic capacitors may be used, whereas for the 600V output a pair of 350V electrolytic capacitors may be implemented. These electrolytic capacitors are connected in series to satisfy the voltage rating requirement.

Such conventional configurations are potentially susceptible to failures that may occur where one of the electrolytic capacitors is shorted.

In one particular and contemporary example, all LED power supplies must be designed to pass an abnormal component fault test as administered according to the UL 8750 standard. One part of this abnormal component fault test involves shorting one of the output electrolytic capacitors, after which the respective power supply must pass the UL dielectric test (i.e., a leakage current test between power source and earth ground).

However, when one of the two electrolytic capacitors is shorted, all of the DC output voltage from the PFC stage will be applied across a single electrolytic capacitor. As a result, the voltage rating of the single electrolytic capacitor would be greatly exceeded, assuming a practical voltage rating as previously noted. Further assuming that the increased voltage across the remaining electrolytic capacitor does not exceed a rating for the fuse 12, the fuse will not open or otherwise prevent subsequent electrolytic capacitor failure, which in turn causes the electrolytic capacitor to blow up and/or substantially discharge the liquid electrolyte included therein. The electrolyte is conductive and may subsequently short the circuit on an associated PCB, which could further form a short circuit to earth ground or the device enclosure. The power supply would accordingly fail the UL leakage test due to this short circuit, as caused by the exploded electrolytic capacitor.

It would therefore be desirable to provide an LED driver with circuitry that prevents total electrolytic capacitor failure in the event that a short condition is sensed in a corresponding electrolytic capacitor.

BRIEF SUMMARY OF THE INVENTION

In accordance with embodiments of a LED driver having transient protection circuitry as disclosed herein, one solution for the aforementioned problem is to force the fuse to blow up immediately after one of the two electrolytic capacitors is shorted. Such a solution as offered herein may preferably allow the LED driver configuration to pass the UL 8750 abnormal component fault test.

In one embodiment, an LED driver as disclosed herein includes a fuse coupled between an AC input and a DC power source, and first and second energy storage elements coupled across the DC power source. A DC-DC converter is further coupled across the DC power source, between the energy storage elements and a load. Transient protection circuits are coupled across each of the energy storage elements and configured upon sensing a short condition across one of the first and second energy storage elements to disable the LED driver prior to failure of the other energy storage element.

In one aspect, the transient protection circuitry may be configured to disable the LED driver by causing the fuse or other circuit interrupter to open. In one embodiment for implementing this aspect, the LED driver may be disabled by causing a short condition across the DC power source, thereby opening the fuse.

In another aspect, the energy storage elements may include electrolytic capacitors coupled in series across an output end of the DC source.

In another aspect, the respective transient protection circuits may include a transient voltage suppressor and a current limiting resistor coupled in series across each of the electrolytic capacitors. The transient voltage suppressors may have breakdown voltage thresholds slightly below a full rated output for the DC source, wherein a sensed short condition across one of the first and second electrolytic capacitors causes a short circuit across the DC source, thereby disabling the LED driver prior to failure of the other electrolytic capacitor. The current limiting resistors may be configured to avoid causing the LED driver to be disabled for transient overvoltage conditions in which neither of the electrolytic capacitors is shorted.

In another aspect, the DC power source may include a bridge rectifier coupled to the AC input and a PFC circuit coupled between the bridge rectifier and the energy storage elements. The voltage suppressors may be Zener diodes having respective breakdown voltage thresholds of >50% and <100% for a full rated output voltage value of the PFC circuit.

In another aspect, the transient protection circuitry may further have first and second current limiting resistances being respectively coupled in series with the first and second transient voltage suppressors.

In various embodiments, the transient protection circuitry may further or in the alternative be configured to avoid causing the LED driver to be disabled for transient overvoltage conditions in which neither of the first and second energy storage elements is shorted.

DETAILED DESCRIPTION OF THE INVENTION

Figure 1:
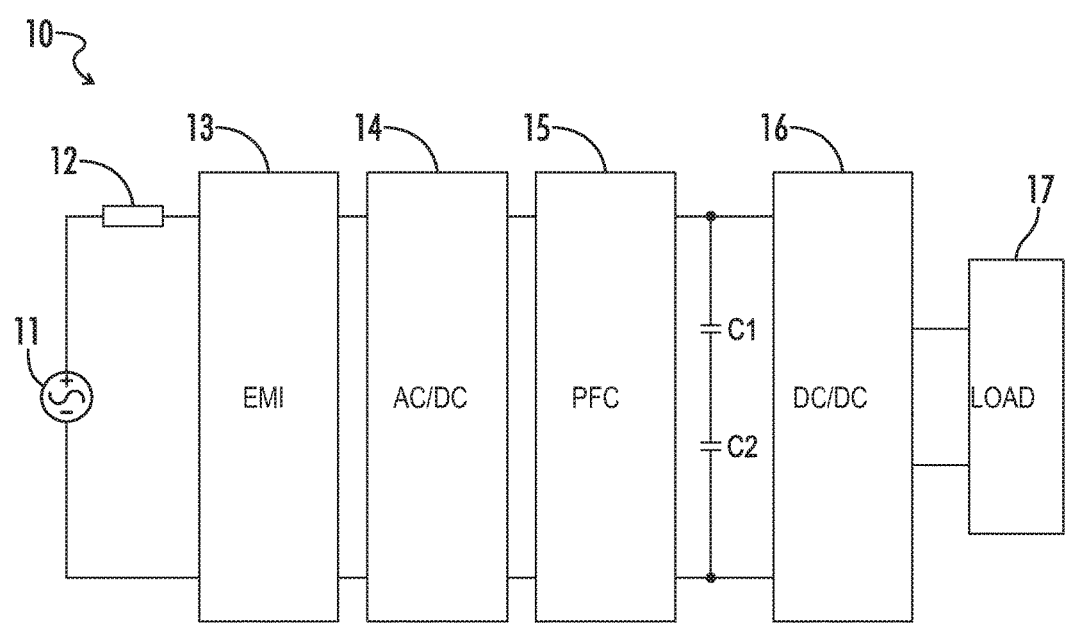
FIG. 1 is a circuit block diagram representing a conventional LED driver configuration.
Figure 2:
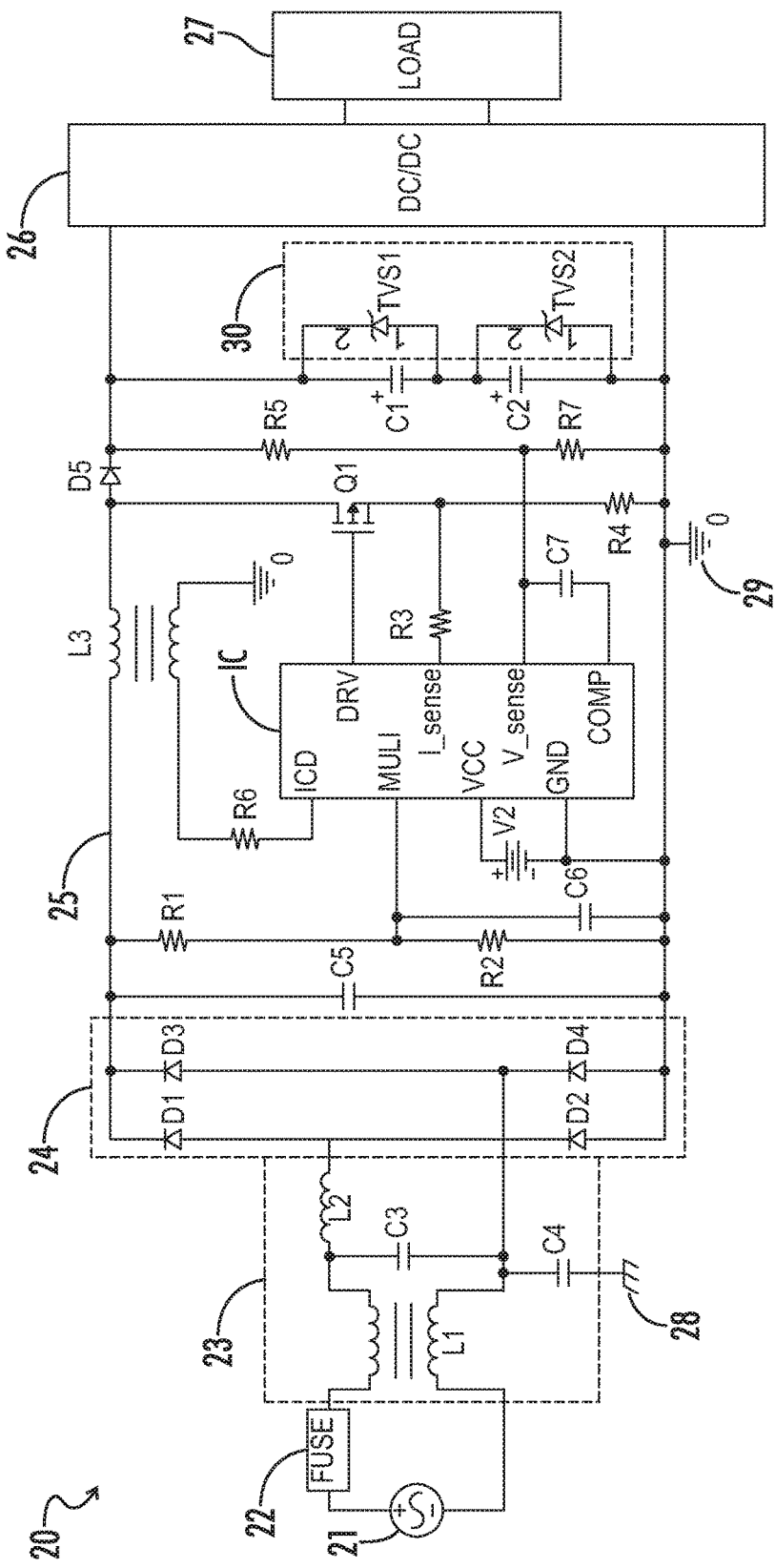
FIG. 2 is a circuit diagram representing an embodiment of an LED driver according to the invention disclosed herein.
Figure 3:
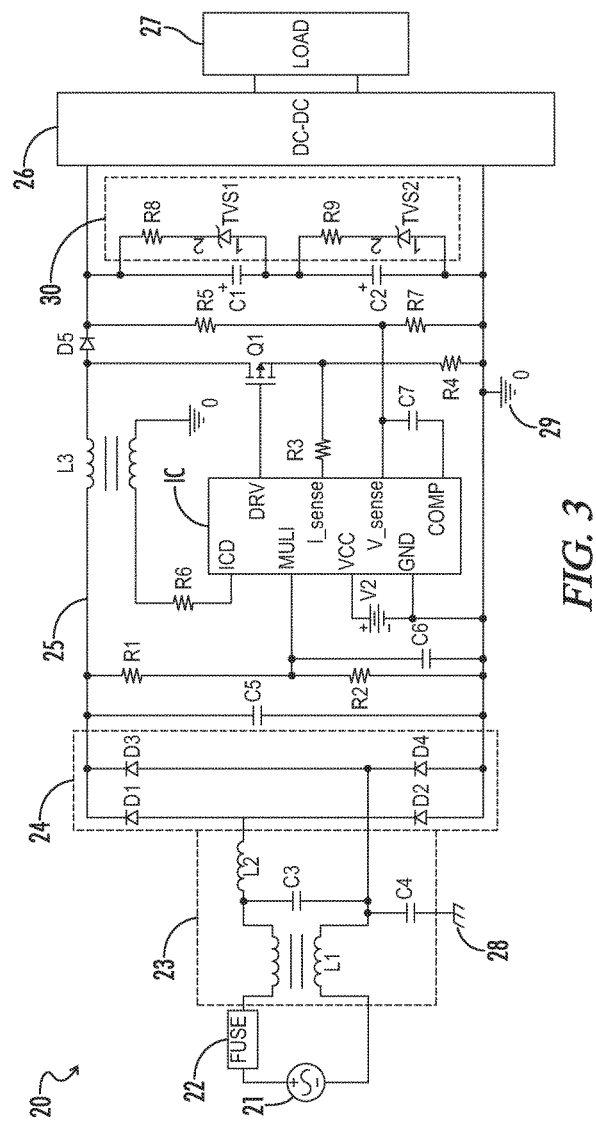
FIG. 3 is a circuit diagram representing another embodiment of an LED driver as disclosed herein.

Referring generally to FIGS. 2 and 3, exemplary embodiments of an invention may now be described in detail. Where the various figures may describe embodiments sharing various common elements and features with other embodiments, similar elements and features are given the same reference numerals and redundant description thereof may be omitted below.

Beginning with FIG. 2, an embodiment of an LED driver 20 as disclosed herein may be configured for coupling to an AC input 21. A circuit interrupter such as a line fuse 22 is connected in series with the input 21, so that in the event of certain abnormal situations the circuit interrupter would become non-conductive (e.g., fuse 22 would open) and disconnect the power supply from the input power source. An EMI filtering circuit 23 is configured to suppress conductive emission and in the illustrated example is formed of a common mode inductor L1, differential mode inductor L2, a first capacitor C3 coupled across the AC line and neutral inputs, and a second capacitor C4 coupled between the neutral and earth ground 28 to bypass common mode noise.

An input diode rectifier bridge 24 includes diodes D1-D4. Capacitor C5 is provided as a filtering capacitor between the rectifier and the PFC stage 25. A PFC controller integrated circuit (IC) provides driver signals (terminal DRV) to a switching element Q1 to perform PFC regulation. The switching element Q1 (coupled to earth ground through resistor R4), diode D5 and boost inductor L3 collectively define a typical boost-type converter. The PFC IC may be coupled to boost inductor L3 through resistor R6 at terminal ICD, to a rectified input voltage at the node between resistors R1, R2 and capacitor C6 applied at terminal MULI, and to a voltage source V2 across terminals VCC and GND. Current and voltage sensing signals are coupled to terminals I_sense (through resistor R3) and V_sense respectively, and to comparator terminal COMP through capacitor C7.

Two electrolytic capacitors C1 and C2 are coupled across the PFC output to buffer the energy for the next DC-DC converter stage 26. The DC-DC converter stage 26 may in various embodiments include an isolated or non-isolated power converter, effective to regulate output power from the LED driver to a load 27, generally an array of one or more LED elements.

In an embodiment as shown, transient protection circuitry 30 is provided across each electrolytic capacitor to immediately sense an electrolytic short condition. Such protection circuitry may include transient voltage suppressors TVS1 and TVS2 connected in parallel with capacitors C1 and C2, respectively. The transient protection circuitry may in an embodiment be formed of Zener diodes. It may be understood generally that the voltage across a single electrolytic capacitor is half of the PFC output voltage. The voltage protection rating for each transient voltage suppressor can therefore be set slightly below (but substantially more than half of) the output voltage rating of the PFC stage. For example, with respect to a 470V output case, the breakdown voltage threshold for a respective transient voltage suppressor can be set around 400V, so that in steady state the voltage across each transient voltage suppressor TVS1, TVS2, is well below the threshold voltage and the respective transient voltage suppressor acts like an open circuit.

When one electrolytic capacitor is shorted, all of the output voltage will be applied across the other of the two electrolytic capacitors, as well as the associated transient voltage suppressor TVS1 or TVS2 connecting in parallel with the non-shorted capacitor C1 or C2. In this situation the output voltage from the PFC stage will be greater than the breakdown threshold for the transient voltage suppressor TVS, such that the transient voltage suppressor TVS will be overpowered and a short condition ensues. All of the output energy from the PFC stage will accordingly be bypassed by the transient protection circuit 30 because there is nothing to limit the current going through the respective transient voltage suppressors TVS1, TVS2. As soon as the transient voltage suppressor TVS fails, a short circuit will accordingly be formed with respect to the power supply 20 and the fuse 22 will be forced open.

In accordance with the aforementioned process, the fuse 22 will open or other circuit interrupter will be disrupted before failure of the (non-shorted) electrolytic capacitor. As neither of the electrolytic capacitors has failed, the power supply will avoid catastrophic failure, and further may be considered to have successfully passed the UL leakage test after the electrolytic short.

One of skill in the art may appreciate, however, that other transient and abnormal conditions may occur during operation with respect to the input power source, such as for example an input voltage surge. During an input surge the input power supply voltage could ring up to, e.g., 2.5 kV, as described in the ANSI 2.5 KV ring-wave surge test. This input energy surge will temporarily increase the PFC output voltage to a relatively high level, which could be more than the two combined breakdown threshold voltages of the transient voltage suppressors TVS1 and TVS2. In such an instance, there is nothing to limit the surge current and therefore the transient voltage suppressor TVS will bypass all the surge current after the electrolytic capacitors and may itself fail. If the transient voltage suppressor TVS fails the fuse will also fail, and cause the power supply to be irretrievably damaged. Obviously, it would further be desirable to provide a power supply configuration that can reliably survive this type of abnormal input surge condition.

Referring now to FIG. 3, another embodiment of an LED driver as disclosed herein will effectively solve the shorted electrolytic capacitor problem as described above, and further can help the power supply survive input surge conditions as otherwise may result from the aforementioned configuration. An embodiment of a transient protection circuit 30 as represented in FIG. 3 includes a first current limiting resistor R8 coupled in series with the first transient voltage suppressor TVS1 and a second current limiting resistor R9 coupled in series with the second transient voltage suppressor TVS2. Each series connection of a current limiting resistor and a transient voltage suppressor is further connected in parallel with a respective electrolytic capacitor.

The resistors R8 and R9 will limit the current going through the associated transient voltage suppressor TVS1, TVS2, during an input surge transient and thereby help the transient voltage suppressor TVS survive the input surge abnormal condition.

In the case where one of the electrolytic capacitors is shorted in the configuration as represented in FIG. 3, there will be a steady high voltage across the resistor and the transient voltage suppressor as well as the electrolytic capacitor. This steady high voltage will cause the transient voltage suppressor to fail, and then the associated resistor. As a result, the source will be shorted, the fuse will open, and the power supply will still avoid electrolytic capacitor failure, and pass the UL dielectric test after the electrolytic short.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another.

The term "circuit interrupter" may include a fuse, a fusible link, a circuit breaker, or other component, device or circuit capable of interrupting current flow in a circuit in response to an overload or threshold current or voltage condition in the circuit.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Depending on the embodiment, certain acts, events, or functions of any of the algorithms described herein can be performed in a different sequence, can be added, merged, or left out altogether (e.g., not all described acts or events are necessary for the practice of the algorithm).

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. An LED driver comprising:
a DC power source;
first and second energy storage elements coupled across the DC power source;
a DC-DC converter coupled to the energy storage elements;
transient protection circuitry coupled across each of the first and second energy storage elements and configured upon sensing a short condition across one of the first and second energy storage elements to disable the LED driver prior to failure of the other of the first and second energy storage elements; and a circuit interrupter coupled in series with the DC power source, wherein the transient protection circuitry is configured to disable the LED driver by causing the circuit interrupter to open.

2. The LED driver of claim 1, wherein the LED driver is disabled by causing a short condition across the DC power source and thereby opening the circuit interrupter.

3. The LED driver of claim 1, wherein the DC power source comprises an input rectifier and a power factor correction (PFC) circuit, and the circuit interrupter is coupled between an AC power source and the input rectifier.

4. The LED driver of claim 1, wherein:
the first and second energy storage elements comprise respective first and second electrolytic capacitors coupled in series across an output end of the DC source; and
the circuit interrupter comprises a fuse.

5. The LED driver of claim 4, wherein the transient protection circuitry comprises first and second transient voltage suppressors, one of the transient voltage suppressors being respectively coupled across each of the first and second electrolytic capacitors.

6. The LED driver of claim 5, wherein the voltage suppressors comprise Zener diodes having respective breakdown voltage thresholds of >50% and <100% for a full rated output voltage value of the PFC circuit.

7. The LED driver of claim 5, wherein the transient protection circuitry further comprises first and second current limiting resistances being respectively coupled in series with the first and second transient voltage suppressors.

8. The LED driver of claim 7, wherein the transient protection circuitry is configured to avoid causing the LED driver to be disabled for transient overvoltage conditions in which neither of the first and second energy storage elements is shorted.

9. An LED driver comprising:
a DC power source;
first and second energy storage elements coupled across the DC power source;
a DC-DC converter coupled to the energy storage elements; and
transient protection circuitry comprising first and second transient voltage suppressors, one of the transient voltage suppressors being respectively coupled across each of the first and second energy storage elements and configured upon sensing a short condition across one of the first and second energy storage elements to disable the LED driver prior to failure of the other energy storage element, and
wherein the transient protection circuitry is further configured to avoid causing the LED driver to be disabled for transient overvoltage conditions in which neither of the first and second energy storage elements is shorted; and
a circuit interrupter coupled in series with the DC power source, wherein the transient protection circuitry is configured to disable the LED driver by causing the circuit interrupter to open.

10. The LED driver of claim 9, wherein the voltage suppressors comprise Zener diodes having respective breakdown voltage thresholds of >50% and <100% for a full rated output voltage value of the DC power source.

11. The LED driver of claim 9, wherein the transient protection circuitry further comprises first and second current limiting resistances being respectively coupled in series with the first and second transient voltage suppressors.

12. The LED driver of claim 9, wherein the LED driver is disabled by causing a short condition across the DC power source and thereby opening the circuit interrupter.

13. The LED driver of claim 12, wherein the DC power source comprises an input rectifier and a power factor correction (PFC) circuit, and the circuit interrupter is coupled between an AC power source and the input rectifier.

14. The LED driver of claim 12, wherein the energy storage elements comprise electrolytic capacitors coupled in series across an output end of the DC source and the circuit interrupter comprises a fuse.

\* \* \* \* \*